July 3, 1951 — N. BALMFORTH — 2,559,337
FLUID ENGAGED AND RELEASED CLUTCH
Filed Oct. 26, 1945 — 3 Sheets-Sheet 1

Inventor
Norman Balmforth
by Michael S. John
his Agent

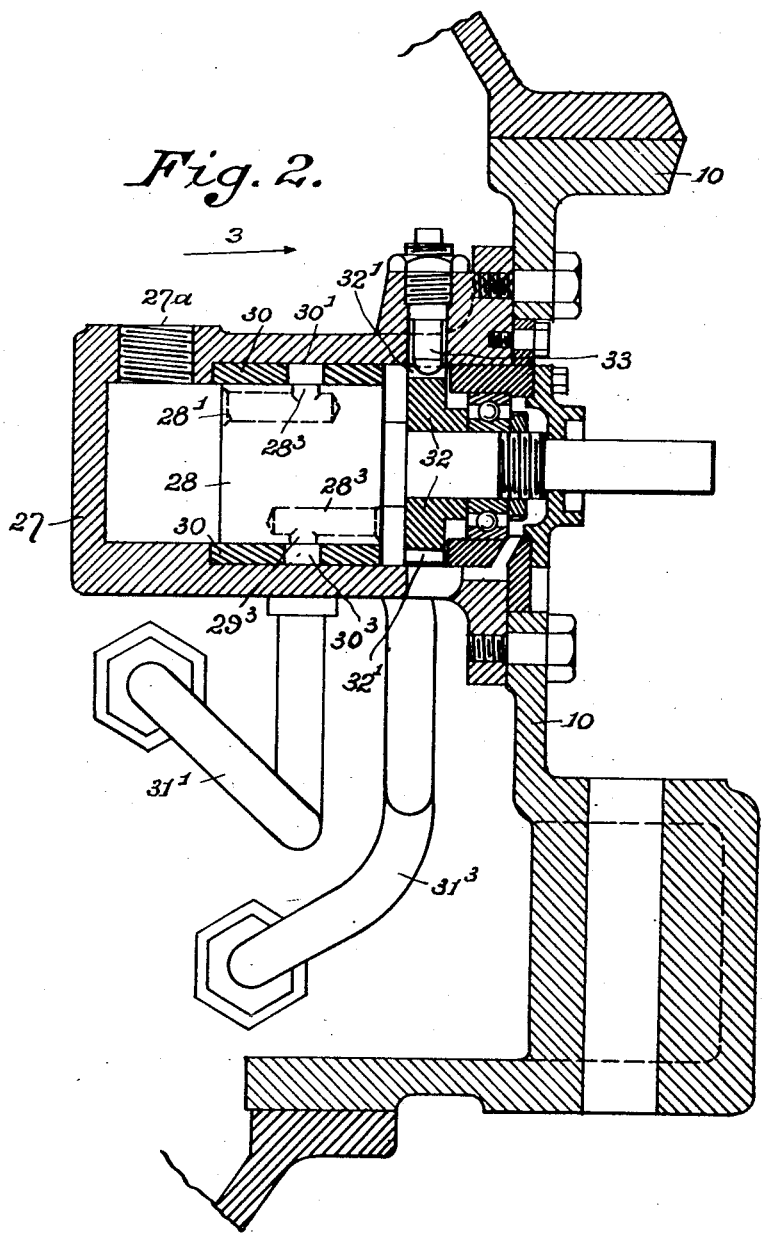

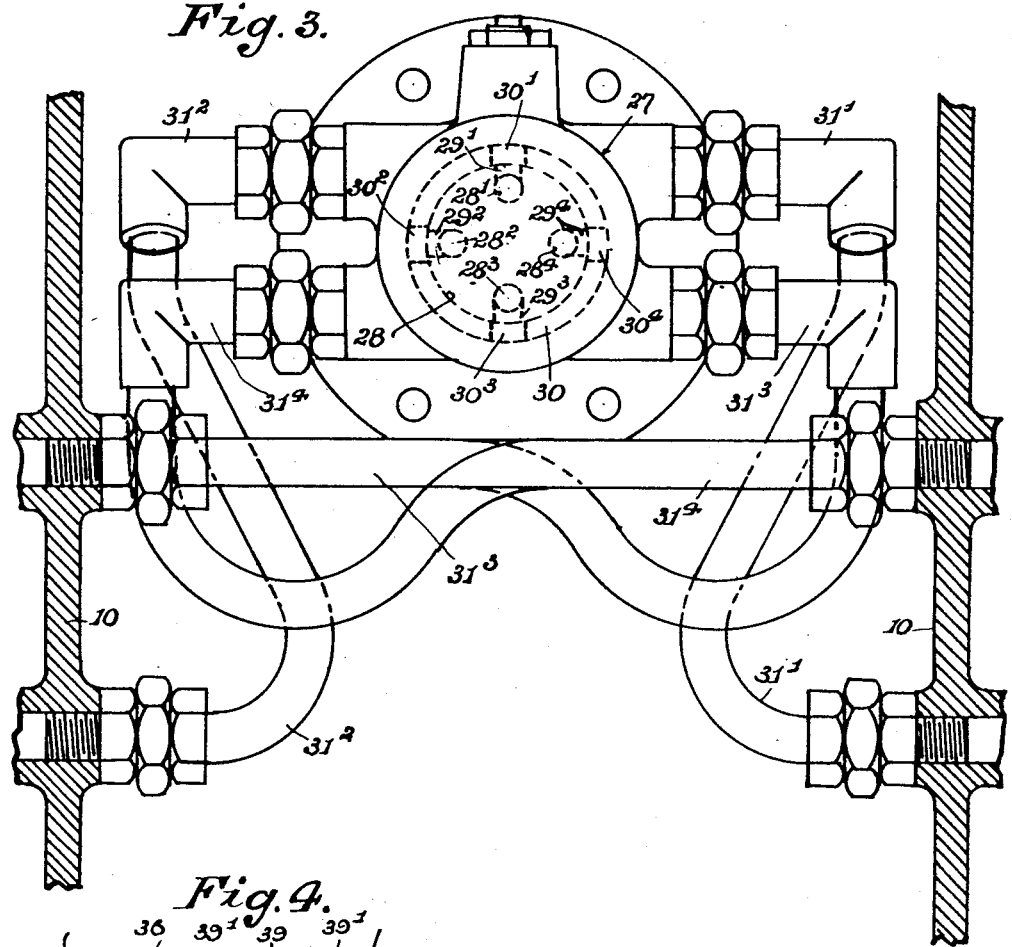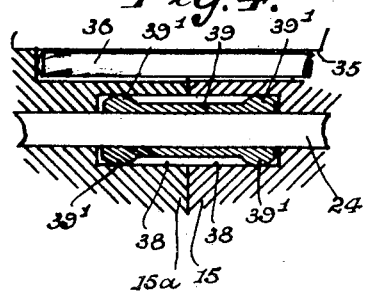

Patented July 3, 1951

2,559,337

UNITED STATES PATENT OFFICE 2,559,337

FLUID ENGAGED AND RELEASED CLUTCH

Norman Balmforth, Huddersfield, England, assignor to David Brown & Sons (Huddersfield), Limited, Huddersfield, England Application October 26, 1945, Serial No. 624,729
In Great Britain October 30, 1944

3 Claims. (Cl. 192—86)

The invention relates to transmission mechanisms employing or incorporating friction clutches of the type wherein the movable member comprises two plates splined on a shaft, and the fixed member forming a chamber enclosing the movable plates and being itself driven from a suitable source, the clutch being engaged by admitting oil under pressure between the movable plates to force them outwardly into engagement with co-operating surfaces on the fixed or outer member, and disengagement being effected by admitting oil under pressure to the spaces between the movable plates and the respective co-operating surfaces of the fixed or outer member.

The invention has for its principal object, in a transmission mechanism of the kind referred to, to provide improved means for controlling the oil supply and distributing it to the clutches.

I propose to describe the application of the invention to a reversing transmission mechanism such as might, for example, be employed between the engine shaft and the propeller shaft of a marine engine, but I would have it understood that this particular application of the invention is only given by way of example and that it can be applied to any other transmission mechanism in which friction clutches of the kind referred to are employed.

In the accompanying drawings to which, in describing the invention, reference will be made, Fig. 1 is a sectional elevation of a reversing transmission mechanism embodying the invention;

Fig. 2 is a sectional elevation showing the control valve arrangement I employ;

Fig. 3 is a view looking in the direction of the arrow 3 in Fig. 2.

Fig. 4 is a detail showing on an enlarged scale the means I employ to bridge the gap between certain of the movable clutch plates when they are moved apart.

Figure 1:
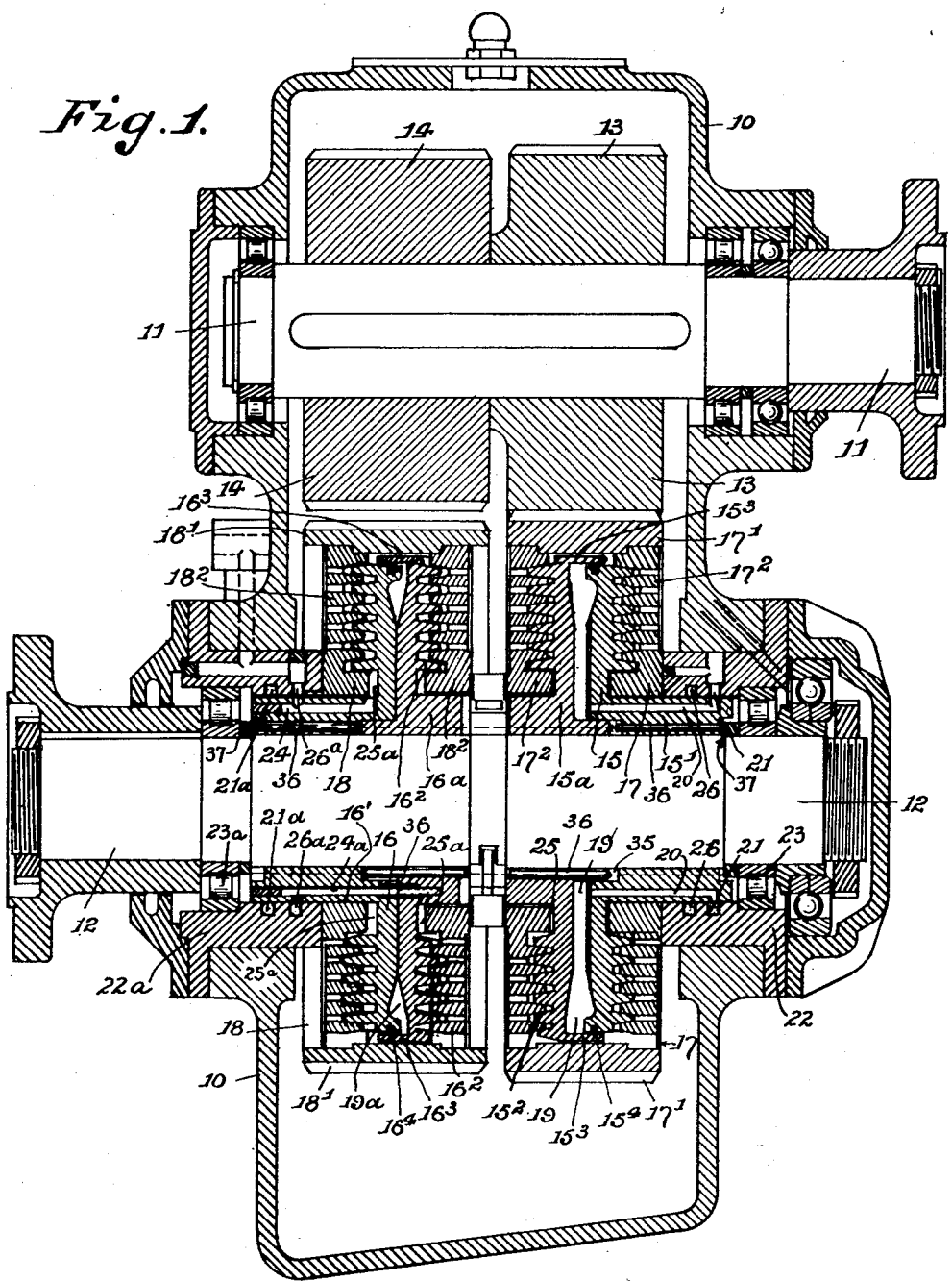

Referring to the drawings, a casing 10 has journalled within it two parallel shafts 11 and 12, the shaft 11 being the driven input shaft and the shaft 12 the output shaft connected to or driving, in the case of a marine engine, the propeller.

The input shaft 11 has fast upon it two toothed gears 13 and 14 and the output shaft 12 carries two friction clutches. The inner members 15, 15a, and 16, 16a of these friction clutches are splined to the shaft 12 whilst the outer members 17 and 18 run loose on the hubs 15' and 16' of the inner members 15 and 16. The outer members 17 and 18 of the clutches are toothed externally, the member 17 being geared directly to the gear 13 on the shaft 11 and the member 18 being geared, through an idler gear, not shown, to the gear 14 on the input shaft.

As will be seen from the drawings the inner members 15, 15a and 16, 16a of the clutches are provided with annular ribs $15^2$ and $16^2$ of wedge form which are adapted, when the said inner members are forced apart, to engage in corresponding wedge-shaped annular grooves in the outer members 17 and 18 respectively. Thus, by controlling appropriately the supply of oil under pressure to the spaces between the movable inner members of the two clutches either of the said clutches can be engaged, according as an ahead or an astern drive be required, or both clutches may be disengaged to provide a neutral or "stop" position.

Each outer clutch member 17 or 18 comprises a toothed rim 17' or 18' and two annularly-ribbed side plates $17^2$ or $18^2$ which screw into internally-threaded portions of the rims, the "hands" of the screw threads being so arranged that the plates are self-tightening as the rims are rotated. All the four side plates $17^2$ or $18^2$ are of similar form, except for the directions of their screw threads.

The movable clutch members 15 and 16 are each provided with a peripheral flange $15^3$ or $16^3$ which overlaps the periphery of the cooperating movable member 15a or 16a. A sealing ring $15^4$ or $16^4$ carried by the clutch member 15 or 16 is sliding inside the flange $15^3$ or $16^3$ on the member 15a or 16a and functions to constitute a sealed chamber 19 or 19a between the respective pairs of movable members 15, 15a and 16, 16a.

Passages such as 20 connect the spaces or chambers 19 and 19a with respective annular grooves 21 or 21a constituted in the adjacent bearing housing 22 or 22a for the bearings 23 or 23a of the output shaft 12. These grooves 21 and 21a will be referred to as the "outer" annular grooves, and other passages 24 or 24a connect the spaces 25 or 25a, between the movable clutch members 15, 15a and 16, 16a and the fixed members constituted by the side plates $17^2$ or $18^2$ respectively, with other annular grooves 26 or 26a in the bearing housings 22 and 22a. These grooves 26 and 26a I shall refer to as the "inner" annular grooves.

Oil is passed, under suitable pressure, through an inlet opening 27a into a valve body 27, see Fig. 2, secured to the wall of the gear casing 10, in this instance to the inner wall of the said casing. A distributing valve housed in the body 27 comprises a rotary valve member 28 having four longitudinal recesses 28' to 28⁴ spaced 90° apart on the same pitch circle. Two of these recesses, 28' and 28², shown in Fig. 3, communicate with or are open to the pressure side, that is to say the side adjacent to the inlet 27a, of the rotary valve member and the other two recesses 28³ and 28⁴ communicate with or are open to the non-pressure side of the rotary valve member, that is to the side opposite to that adjacent the inlet opening 27a. Each recess 28' and 28⁴ has at its inner end a radial passage 29' to 29⁴ leading to the periphery of the rotary valve member.

Surrounding the rotary valve member is a sleeve 30 provided with four ports 30' to 30⁴ which communicate with respective passages 31' to 31⁴. Two of these passages 31' and 31² are pipe connected respectively to the outer and inner grooves 21 and 26 and the other two passages 31³ and 31⁴ are connected respectively to the outer and inner grooves 21a and 26a.

A collar 32, fast with the rotary valve member 28, has three peripheral notches such as 32' with which there cooperates a spring plunger 33, the said notches being so spaced apart circumferentially that the rotary valve member can be held in any one of three positions, (a) in which one clutch is engaged and the other disengaged, giving an output drive in one direction; (b) in which both clutches are disengaged; and (c) in which the first-mentioned clutch is disengaged and the other is engaged, giving a reverse drive. Suitable provision may be made to prevent any possibility of both clutches being engaged at the same time.

The utilisation as herein set forth of the bearing housings to convey oil to the clutches is a feature of considerable importance from a production point of view, obviating as it does the necessity for providing passages through the shaft on which the clutches are carried, as has been the usual practice hitherto in mechanisms of the kind concerned.

In order to avoid any possibility, when a clutch is being disengaged, of one of its movable members disengaging first and moving so far as to hold or prevent the other member from disengaging, each member has a series of circumferentially-spaced longitudinal openings, say three in number, such as 35, the openings in one plate being offset from those in the other.

Loosely slidable in these openings 35 are rods 36 of such length that when their outer ends are in contact with fixed abutments 37 their inner ends project such a distance beyond the inner faces of the movable members, when the latter are in the engaged position, as will limit the approach of one member towards the other, both members being thus able to move in a disengaging direction without any material interference.

As it is necessary for oil to be conveyed through openings in both movable members of a clutch in order to reach the inner side of the inner movable members for disengaging purposes, some means have to be provided to bridge the gap between the two members when they are moved apart to effect clutch engagement and it is, moreover, desirable that these means be flexible or yielding in character. I may, therefore, provide in the inner face of each member a recess 38, see Fig. 4, of suitable depth, and confine in these recesses a sleeve 39 of such length that its ends do not become uncovered when the members are moved apart. In order to make tight joints with the walls of the recesses the end portions 39' of the sleeve may be barrel-shaped and be a good tight sliding fit in the recesses. Alternatively, nipples on the movable members may be connected by a short length of flexible tubing.

It will be apparent that, in an application of the invention to a mechanism employing more than two friction clutches, the rotary valve member 28 will require to have an increased number of openings or ports controlling an increased number of passages or conduits to the respective clutches.

Having thus described my invention what I claim as new and desire to secure by Letters Patent is:

1. An oil supply system for friction clutches of a power transmission mechanism in which oil under pressure is admitted between two movable clutch members splined on an output shaft to bring the movable clutch members into engagement with stationary clutch members forming a chamber enclosing the movable members and between the movable and stationary clutch members to bring them out of engagement, comprising in combination a casing enclosing the transmission mechanism; bearing housings for the output shaft arranged within said casing; an oil distributing valve supported by said casing; oil passages in said casing connected with said distributing valve; oil grooves in said bearing housings cooperating with said oil passages in said casing; oil passages in the movable clutch members cooperating with said oil grooves in said bearing housings so as to convey oil forced by said oil distributing valve into said oil passages in said casing into the spaces between the movable clutch members and into the spaces between the outer faces of the movable clutch members and the stationary clutch members.

2. An oil supply system for friction clutches of a power transmission mechanism in which oil under pressure is admitted between two movable clutch members splined on an output shaft to bring the movable clutch members into engagement with stationary clutch members forming a chamber enclosing the movable members and between the movable and stationary clutch members to bring them out of engagement, comprising in combination a casing enclosing the transmission mechanism; bearing housings for the output shaft arranged within said casing; an oil distributing valve supported by said casing; first oil passages connected with said distributing valve; annular oil grooves in said bearing housings cooperating with said first oil passages; second oil passages in the movable clutch members cooperating with said oil grooves in said bearing housings so as to convey oil forced by said oil distributing valve into said first oil passages into the spaces between the movable clutch members and into the spaces between the outer faces of the movable clutch members and the stationary clutch members.

3. An oil supply system for friction clutches of a power transmission mechanism in which oil under pressure is admitted between two movable clutch members splined on an output shaft to bring the movable clutch members into engagement with stationary clutch members forming a chamber enclosing the movable members and between the movable and stationary clutch members to bring them out of engagement, comprising in combination a casing enclosing the transmission mechanism; bearing housings for the output shaft arranged within said casing; an oil distributing valve supported by said casing; first oil passages in said casing connected with said distributing valve; oil grooves in said bearing housings cooperating with said first oil passages in said casing; second oil passages cooperating with said oil grooves in said bearing housings and arranged so as to convey oil forced by said oil distributing valve into said first oil passages in said casing into the spaces between the movable clutch members and into the spaces between the outer faces of the movable clutch members and the stationary clutch members.

NORMAN BALMFORTH.

REFERENCES CITED

The following references are of record in the file of this patent:

UNITED STATES PATENTS

| Number | Name | Date |
|---|---|---|
| 506,517 | Leibert | Oct. 10, 1893 |
| 1,475,020 | Mayer | Nov. 20, 1923 |
| 2,028,152 | Gray | Jan. 21, 1936 |
| 2,094,449 | Forichon | Sept. 28, 1937 |
| 2,150,950 | Thoma | Mar. 21, 1939 |
| 2,204,872 | Thompson | June 18, 1940 |
| 2,423,886 | Hindmarch | July 15, 1947 |

FOREIGN PATENTS

| Number | Country | Date |
|---|---|---|
| 37,639 | Netherlands | Feb. 16, 1936 |
| 143,185 | Switzerland | Oct. 31, 1930 |
| 207,318 | Great Britain | Nov. 29, 1923 |
| 232,734 | Great Britain | Apr. 30, 1925 |